(12) United States Patent
Zhang

(10) Patent No.: US 11,468,789 B2
(45) Date of Patent: Oct. 11, 2022

(54) ELECTROENCEPHALOGRAM—CONTROLLED VIDEO INPUT AND AUDITORY DISPLAY BLIND GUIDING APPARATUS AND METHOD

(71) Applicant: SOUTH CHINA UNIVERSITY OF TECHNOLOGY, Guangdong (CN)

(72) Inventor: Jun Zhang, Guangdong (CN)

(73) Assignee: SOUTH CHINA UNIVERSITY OF TECHNOLOGY, Guangzhou (CN)

(*) Notice: Subject to any disclaimer, the term of this patent is extended or adjusted under 35 U.S.C. 154(b) by 359 days.

(21) Appl. No.: 16/640,353

(22) PCT Filed: Oct. 30, 2018

(86) PCT No.: PCT/CN2018/112820
§ 371 (c)(1),
(2) Date: Feb. 20, 2020

(87) PCT Pub. No.: WO2019/100915
PCT Pub. Date: May 31, 2019

(65) Prior Publication Data
US 2020/0357303 A1 Nov. 12, 2020

(30) Foreign Application Priority Data
Nov. 24, 2017 (CN) .......................... 201711185716.3

(51) Int. Cl.
*G09B 21/00* (2006.01)
*G06T 7/194* (2017.01)
(Continued)

(52) U.S. Cl.
CPC ........... *G09B 21/006* (2013.01); *G06F 3/015* (2013.01); *G06F 3/165* (2013.01); *G06T 7/194* (2017.01);
(Continued)

(58) Field of Classification Search
CPC combination set(s) only.
See application file for complete search history.

(56) References Cited

U.S. PATENT DOCUMENTS

2002/0198685 A1* 12/2002 Mann ..................... A63H 30/04
702/187
2014/0203937 A1 7/2014 Gilham et al.

FOREIGN PATENT DOCUMENTS

CN 104127301 11/2014
CN 104127301 A * 11/2014
(Continued)

OTHER PUBLICATIONS

Device for Navigation of Blind People UA 61592 U (Aptekar et al.); Date Published: Jul. 25, 2011.*
(Continued)

*Primary Examiner* — Melur Ramakrishnaiah
(74) *Attorney, Agent, or Firm* — JCIPRNET

(57) ABSTRACT

The invention discloses an electroencephalogram-controlled video input and auditory display blind guiding apparatus and method. The apparatus includes a video acquisition module, an electroencephalogram acquisition module, a processor and an audio playback module. The video acquisition module is connected to the processor, the electroencephalogram module is connected to the processor and configured to acquire an electroencephalogram signal, the audio playback module is connected to the processor, and the processor is separately connected to the video acquisition module, the electroencephalogram acquisition module and the audio playback module. According to the present invention, control of a region of interest in the blind guiding apparatus is achieved by means of the electroencephalogram signal, so that sensing a whole image and sensing details of interest in the image are switched conveniently. A region of interest in a current video is set by using the electroencephalogram, a
(Continued)

flexible auditory display resolution and a control method are provided for a user, and the user can sense global information or local detail information of the image with the setting of the region of interest, so that the defect of low auditory display resolution is overcome effectively. The invention can be widely applied to different occasions where blind guiding is required.

3 Claims, 5 Drawing Sheets

(51) Int. Cl.
    *G06F 3/01*        (2006.01)
    *G06F 3/16*        (2006.01)
    *H04S 1/00*        (2006.01)
    *H04S 7/00*        (2006.01)

(52) U.S. Cl.
    CPC .............. *H04S 1/007* (2013.01); *H04S 7/303* (2013.01); *G06T 2207/10016* (2013.01); *H04S 2400/11* (2013.01); *H04S 2400/13* (2013.01); *H04S 2420/01* (2013.01)

(56) References Cited

FOREIGN PATENT DOCUMENTS

| CN | 106681484 | | 5/2017 |
|---|---|---|---|
| CN | 106691484 A | * | 5/2017 |
| CN | 107888973 | | 4/2018 |

OTHER PUBLICATIONS

"International Search Report (Form PCT/ISA/210) of PCT/CN2018/112820," dated Feb. 29, 2019, with English translation thereof, pp. 1-4.

* cited by examiner

ELECTROENCEPHALOGRAM—CONTROLLED VIDEO INPUT AND AUDITORY DISPLAY BLIND GUIDING APPARATUS AND METHOD

CROSS-REFERENCE TO RELATED APPLICATION

This application is a 371 of international application of PCT application serial no. PCT/CN2018/112820, filed on Oct. 30, 2018, which claims the priority benefit of China application no. 201711185716.3, filed on Nov. 24, 2017. The entirety of each of the above mentioned patent applications is hereby incorporated by reference herein and made a part of this specification.

TECHNICAL FIELD

The present invention relates to the field of signal processing, and more particularly, to an electroencephalogram-controlled video input and auditory display blind guiding apparatus and method.

BACKGROUND

90% of information acquired by human beings comes from vision, and visual damage will bring great inconvenience to people's lives. After occurrence of the visual damage, a patient can usually utilize some apparatuses to convert visual information into a signal that other sensory organs can sense after adaptation and training, thus indirectly obtaining some visual functions with the help of other sensory organs and improving a self-care ability and a quality of life. The apparatus that converts the visual information into the signal that other sensory organs can sense is commonly referred to as a blind guiding system.

The existing blind guiding system has many different structures, the commonly used input sensors include ultrasound, infrared ray, laser, video, multi-sensor input, etc., and sensory organs used to replace vision are usually tactile and auditory, so that an output display mode is generally divided into tactile display and auditory display. Since a video input blind guiding system has advantages of abundant input information and easy detection of plane identification, and the auditory display has characteristics of multi-dimension, omni-direction and parallel output, which is suitable for representing multi-dimensional data, a video input and auditory display structure has been widely used in the blind guiding system.

The existing video input and auditory display blind guiding system is usually composed of an image processing module and an auditory display module, the image processing module extracts important image information from video input, and the auditory display module is responsible for mapping the image information into sound parameters and synthesizing a corresponding sound according to the parameters to be played back to a user. According to different modes of playing the sound, the auditory display can also be divided into voice display and non-voice display, the voice display describes a content of video to the user by using a synthesized or recorded voice clip, and the non-voice display reflects the image information by adjusting tone, volume, timbre, spatial orientation and other multidimensional characteristics of the sound.

However, the existing video input and auditory display blind guiding system has the following defects: (1) a resolution of the auditory display is low. Since auditory organs and visual organs of human beings receive information in different modes, the existing auditory display technology can only roughly represent a key content in the video input, and it is difficult to further represent more detailed video information. (2) The resolution of the auditory display is fixed. In the existing video input and auditory display blind guiding system, the auditory display usually has a fixed mapping relationship with a picture of the video input, so that the auditory display has a fixed resolution and is difficult to provide further information to the user. (3) The control is not flexible. In the existing video input and auditory display blind guiding system, it is difficult for the user to watch a region of interest, focus upon a distance and perform other actions as conveniently as using the visual organs, so that the system is not convenient and flexible to use.

SUMMARY

Aiming at the defects of the existing video input and auditory display blind guiding system, the present invention provides an electroencephalogram-controlled video input and auditory display blind guiding apparatus and method, and setting of a region of interest in an image is controlled by using an electroencephalogram signal, so that a higher and more flexible auditory display resolution and a control method are provided for a user, and the present invention is closer to a use habit of vision and can be widely applied to different occasions where blind guiding is required.

The objective of the present invention is achieved by at least one of the following technical solutions.

An electroencephalogram-controlled video input and auditory display blind guiding apparatus provided by the present invention is jointly composed of a video acquisition module, an electroencephalogram acquisition module, a processor and an audio playback module, wherein the video acquisition module is connected to the processor and configured to acquire a video signal, the electroencephalogram acquisition module is connected to the processor and configured to acquire an electroencephalogram signal, the audio playback module is connected to the processor and configured to play back an audio synthesized by the processor, and the processor is separately connected to the video acquisition module, the electroencephalogram acquisition module and the audio playback module and configured to complete functions of extracting image information from the video signal, mapping the image information into an audio signal, and changing a current region of interest according to the electroencephalogram signal.

The electroencephalogram-controlled video input and auditory display blind guiding apparatus as described above further includes an input module connected to the processor and configured to set parameters of a system.

The video acquisition module as described above is one of a visible light video signal acquisition module and a depth video signal acquisition module.

An electroencephalogram-controlled video input and auditory display blind guiding method provided by the present invention includes the following steps:

step 1: acquiring the video signal by the video acquisition module and transmitting the video signal to the processor;

step 2: extracting, by the processor, the image information of the current region of interest in the video;

step 3: mapping, by the processor, the image information obtained in the step 2 into the audio signal according to a mapping relationship between the current image information and the audio signal;

step 4: outputting the audio signal obtained in the step 3 to the audio playback module for playing back;

step 5: acquiring, by the electroencephalogram acquisition module, the electroencephalogram signal and transmitting the electroencephalogram signal to the processor; and step 6: recognizing, by the processor, the current electroencephalogram signal, modifying the setting of the current region of interest according to a recognition result, and then returning to the step 1 for continuous execution.

The following method is used in the step 2 to extract the image information of the current region of interest in the video:

step 2.1: intercepting a frame of image from a current video stream;

step 2.2: intercepting a corresponding sub-image in a current video image according to a position of the current region of interest; and step 2.3: performing image segmentation on the sub-image obtained in the step 2.2, and dividing a foreground object and a background.

The following method is used in the step 3 to map the image information into the audio signal:

step 3.1: mapping a coordinate of each pixel in the image into an incoming wave direction in a sound field;

step 3.2: mapping a brightness of a pixel of the foreground object as described above into a sound intensity according to setting of an intensity of mapping of a current image brightness into a sound intensity and step 3.3: calculating a head transmission function in the incoming wave direction corresponding to each pixel, amplifying a preset excitation audio to the sound intensity corresponding to the pixel as described above, and then filtering with the head transmission function to obtain a dual-channel audio signal corresponding to the pixel as described above.

The following method is used in the step 4 to output the audio signal to the audio playback module for playing back:

step 4.1: selecting a foreground object in a sub-image obtained in the step 2.2;

step 4.2: extracting dual-channel audio signals corresponding to all pixel points of the foreground object;

step 4.3: playing back the dual-channel audio signals as described above successively; and step 4.4: if an unselected foreground object still exists in the sub-image, selecting the unselected foreground object, and then returning to the step 4.2, otherwise, finishing playing back the audio corresponding to the frame of image.

The following method is used in the step 6 to modify the setting of the current region of interest according to the current electroencephalogram signal: when the audio playback module plays back the audio signal corresponding to the pixel point of some foreground object, detecting whether an auditory evoked potential exists in the electroencephalogram signal, when an auditory evoked potential is continuously detected, moving a center of the current region of interest to a center of the foreground object according to a preset step length, and reducing an area of the region of interest according to the preset step length; and when continuous auditory evoked potentials cannot be detected, moving the center of the current region of interest to a center of the image obtained in the step 2.1 according to the preset step length, and increasing the area of the region of interest according to the preset step length.

Compared with the prior art, the present invention has the following beneficial effects:

1. According to the present invention, control of the region of interest in the blind guiding system is achieved by means of the electroencephalogram signal, so that sensing a whole image and sensing details of interest in the image are switched conveniently. Compared with the existing products, the control is more flexible and the system is closer to a use habit of vision.

2. According to the present invention, the setting of region of interest in the current video is configured by using the electroencephalogram, a flexible auditory display resolution and a control method are provided for a user, and the user can sense global information or local detail information of the image with the setting of the region of interest, so that the defect of low auditory display resolution is overcome effectively.

DRAWINGS

DETAILED DESCRIPTION

To make the objectives, technical solutions, and advantages of the present invention clearer, the present invention is further described in detail hereinafter with reference to the drawings and embodiments. It should be understood that the specific embodiments described herein are only used to explain the present invention, but do not limit the protection scope of the present invention. Unless specifically stated in detail below, all the specific embodiments can be realized or understood by those skilled in the art with reference to the prior art.

Figure 1:
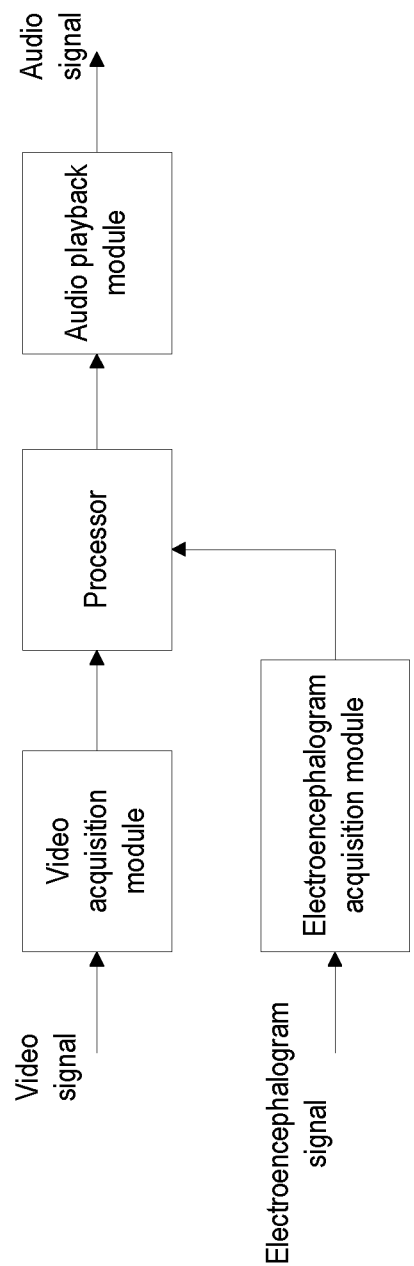
FIG. 1 is a structural block diagram of an electroencephalogram-controlled video input and auditory display blind guiding apparatus according to an embodiment of the present invention.

FIG. 1 show a structure of an electroencephalogram-controlled video input and auditory display blind guiding apparatus according to an embodiment of the present invention. In the embodiment, a blind guiding apparatus is jointly composed of a video acquisition module, an electroencephalogram acquisition module, a processor and an audio playback module, wherein the video acquisition module is a miniature camera installed on glasses, connected to the processor and configured to acquire a video signal. In other embodiments, the video acquisition module is a binocular camera providing depth information. The electroencephalogram acquisition module is an electroencephalogram sensor head band, connected to the processor and configured to acquire an electroencephalogram signal. The audio playback module is a dual-channel headset, connected to the processor and configured to play back an audio synthesized by the processor. The processor is composed of a DSP chip and a peripheral circuit thereof, separately connected to the video acquisition module, the electroencephalogram acquisition module and the audio playback module by an IO interface and configured to complete functions of extracting image information from the video signal, mapping the image information into an audio signal, and changing a current region of interest according to the electroencephalogram signal.

In another embodiment, the electroencephalogram-controlled video input and auditory display blind guiding apparatus further includes an input module connected to the processor and configured to set parameters of the apparatus. The module is realized by a key array, and the parameters that can be set include but are not limited to switch, volume increase, volume decrease, contrast increase and contrast decrease.

Figure 2:
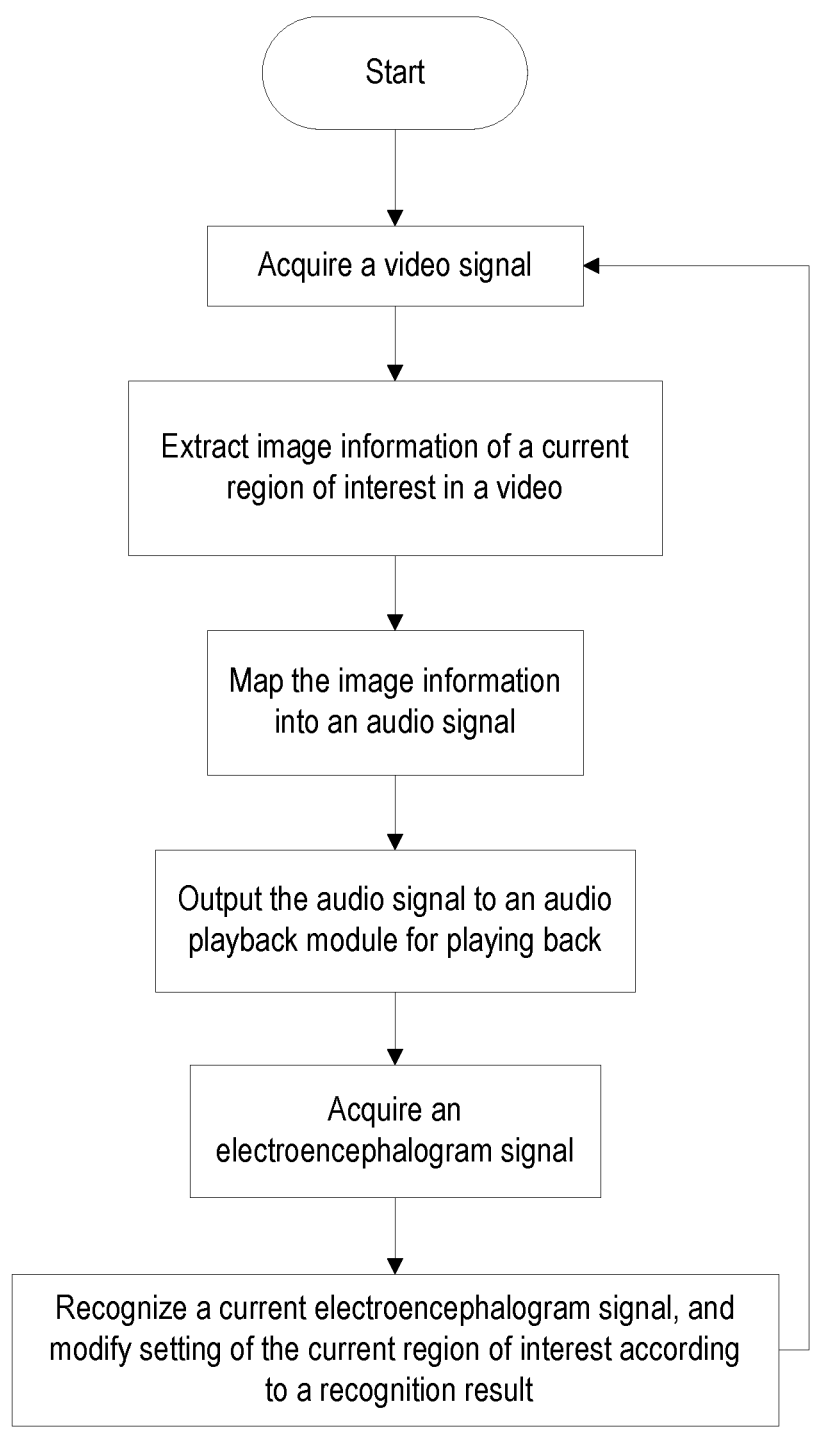
FIG. 2 is a flowchart of an electroencephalogram-controlled video input and auditory display blind guiding method according to an embodiment of the present invention.

In the embodiment as described above, the following method is used to realize electroencephalogram-controlled video input and auditory display blind guiding, and a flow thereof is shown in FIG. 2.

In step 1, the video signal is acquired by the video acquisition module and the video signal is transmitted to the processor.

In the embodiment as described above, a main process of software of the processor derives a video acquisition sub-process during operating, the video acquisition module is controlled to acquire the video signal in real time through the IO interface of the processor, and the video signal is stored in a buffer zone.

Figure 3:
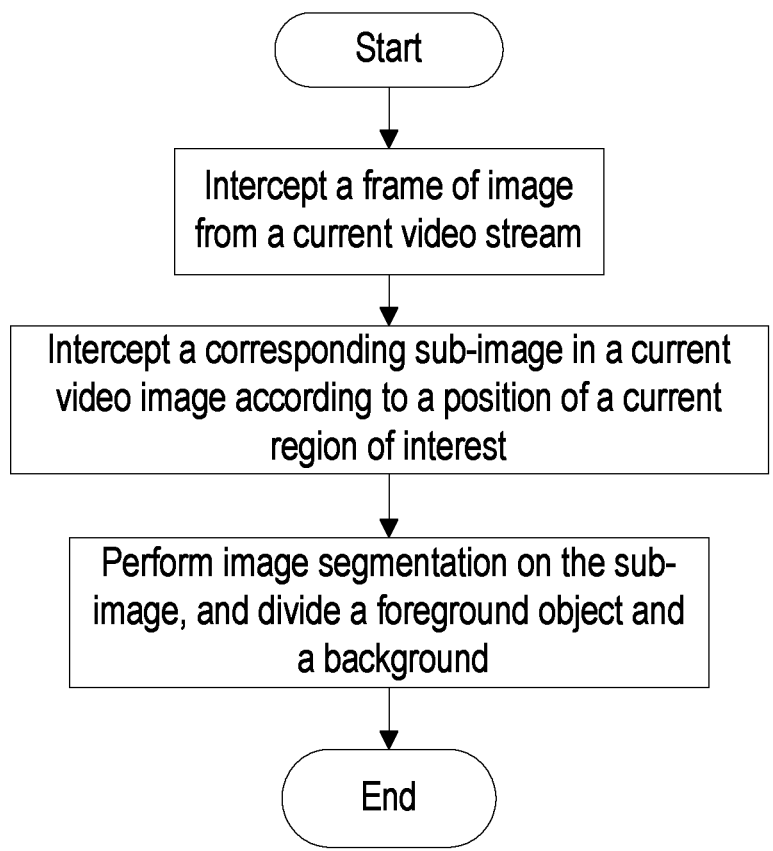
FIG. 3 is a flowchart of extracting image information of a current region of interest in video in the electroencephalogram-controlled video input and auditory display blind guiding method according to the embodiment of the present invention.

In step 2, the processor extracts the image information of the current region of interest in the video. In the embodiment as described above, extraction of the image information specifically includes the following steps, and a flow thereof is shown in FIG. 3.

In step 2.1, a frame of image is intercepted from a current video stream.

In step 2.2, a corresponding sub-image is intercepted in a current video image according to a position of the current region of interest. In the embodiment as described above, the current region of interest is a rectangular region.

In step 2.3, image segmentation is performed on the sub-image obtained in the step 2.2, and a foreground object and a background are divided. In the embodiment as described above, the image segmentation is realized by a watershed algorithm.

Figure 4:
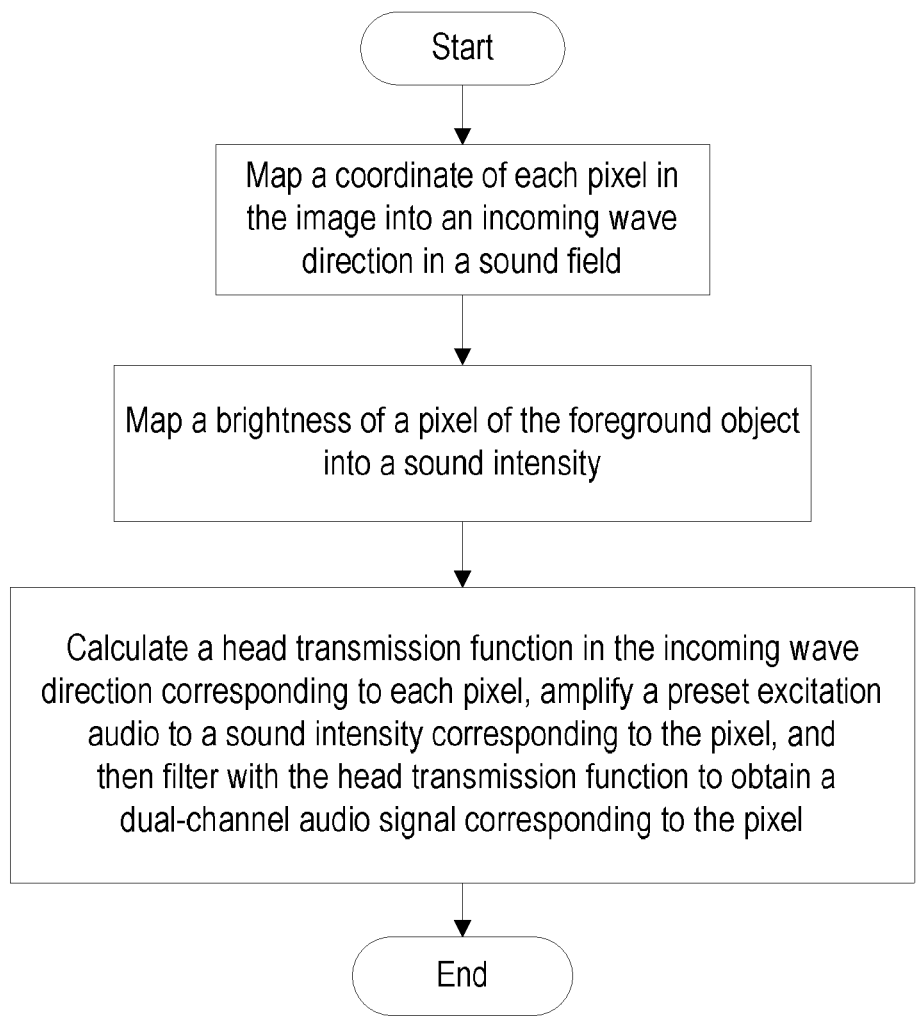
FIG. 4 is a flowchart of mapping the image information into an audio signal in the electroencephalogram-controlled video input and auditory display blind guiding method according to the embodiment of the present invention.

In step 3, the processor maps the image information obtained in the step 2 into the audio signal according to a mapping relationship between the current image information and the audio signal. In the embodiment as described above, the following method is used to map the image information into the audio signal, and a flow thereof is shown in FIG. 4.

In step 3.1, a coordinate of each pixel in the image is mapped into an incoming wave direction in a sound field. The embodiment as described above is realized by the following steps.

In step 3.3.1, region sizes of a field of view and a sound field are determined in advance.

In step 3.3.2, an elevation angle and a direction angle of a midpoint of the field of view corresponding to each pixel in an image of the field of view are calculated.

In step 3.3.3, the elevation angle and the direction angle of each pixel are converted into the incoming wave direction in the sound field according to a proportional relation between the sizes of the field of view and the sound field.

In step 3.2, a brightness of a pixel of the foreground object as described above is mapped into a sound intensity according to setting of an intensity of mapping of a current image brightness into a sound intensity.

In step 3.3, a head transmission function (head-related transmission function) in the incoming wave direction corresponding to each pixel is calculated, a preset excitation audio is amplified to the sound intensity corresponding to the pixel, and then filtering is performed with the head transmission function to obtain a dual-channel audio signal corresponding to the pixel.

Figure 5:
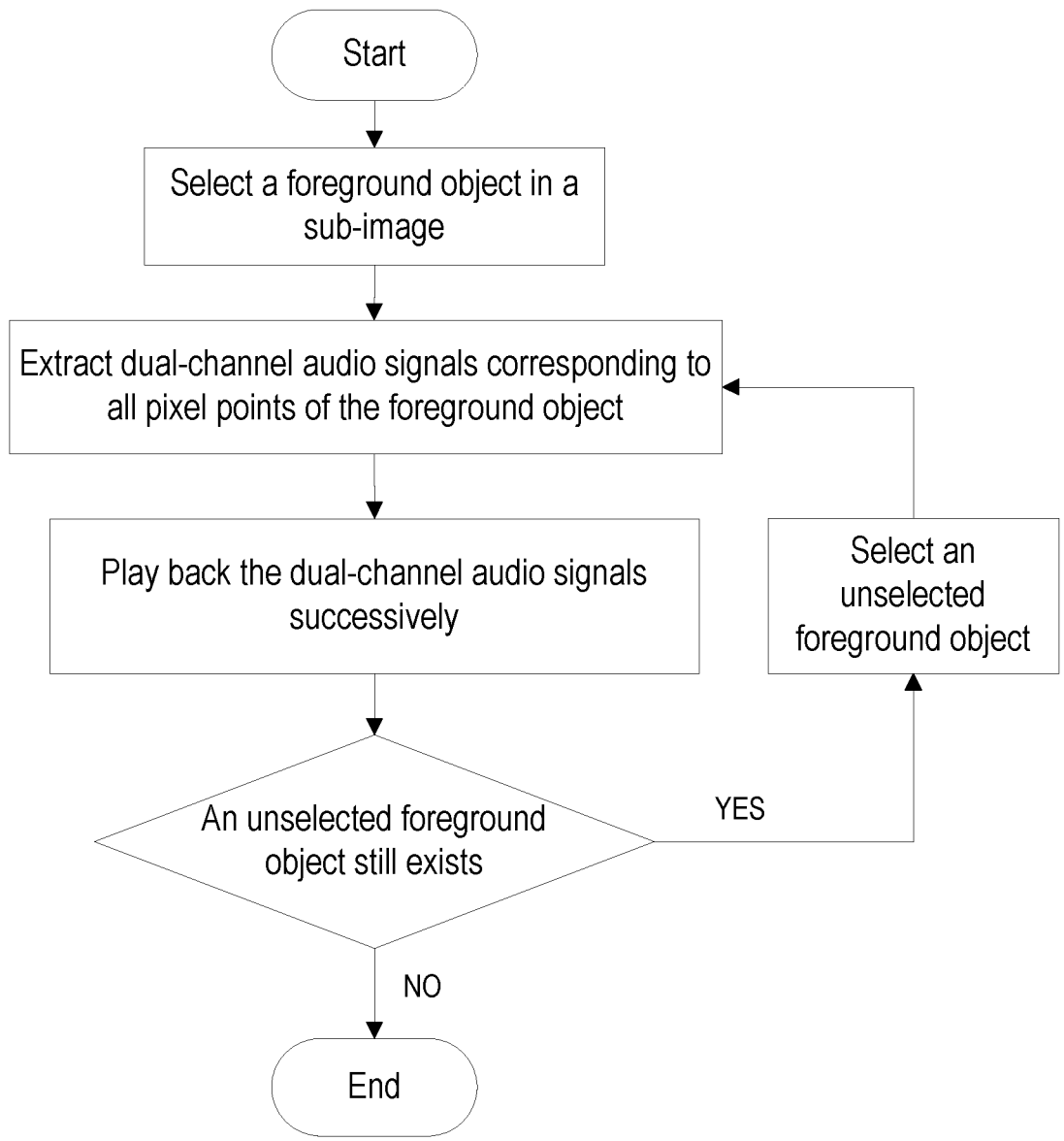
FIG. 5 is a flowchart of outputting the audio signal to an audio playback module for playing back in the electroencephalogram-controlled video input and auditory display blind guiding method according to the embodiment of the present invention.

In step 4, the audio signal obtained in the step 3 is outputted to the audio playback module for playing back. The following steps are specifically used, and a flow thereof is shown in FIG. 5.

In step 4.1, a foreground object in a sub-image obtained in the step 2.2 is selected. In the embodiment as described above, the foreground object after image segmentation is numbered firstly, and then a foreground object is selected according to a numbering sequence.

In step 4.2, dual-channel audio signals corresponding to all pixel points of the foreground object are extracted.

In step 4.3, the dual-channel audio signals as described above are played back successively. In the embodiment as described above, the dual-channel audio signals corresponding to the pixels of the foreground object are played back in a loop in a random sequence within a preset time interval.

In step 4.4, if an unselected foreground object still exists in the sub-image, the unselected foreground object is selected, and then the step 4.2 is returned, otherwise, playing back of the audio corresponding to the frame of image is finished.

In step 5, the electroencephalogram acquisition module acquires the electroencephalogram signal and transmits the electroencephalogram signal to the processor.

In the embodiment as described above, the main process of software of the processor derives an electroencephalogram acquisition sub-process during operating, the electroencephalogram acquisition module is controlled to acquire the electroencephalogram signal in real time through the IO interface of the processor, and the electroencephalogram signal is stored in the buffer zone.

In step 6: the processor recognizes the current electroencephalogram signal and modifies the setting of the current region of interest according to a recognition result, and then the step 1 is returned for continuous execution.

In the embodiment as described above, an auditory evoked potential is used to detect an electroencephalogram command, when a user hears the audio signal corresponding to the pixel point of the foreground object expected to be further enlarged, the user counts silently in heart to generate an auditory evoked potential signal. In the embodiment as described above, the following method is used to modify the setting of the current region of interest according to the current electroencephalogram signal: when the audio playback module plays back the audio signal corresponding to the pixel point of some foreground object, detecting whether an auditory evoked potential exists in the electroencephalogram signal, when an auditory evoked potential is continuously detected, moving a center of the current region of interest to a center of the foreground object according to a preset step length, and reducing an area of the region of interest according to the preset step length, wherein if the area of the region of interest reaches a preset minimum value, the electroencephalogram signal is no longer responded; and when continuous auditory evoked potentials cannot be detected, moving the center of the current region of interest to a center of the image obtained in the step 2.1 according to the preset step length, and increasing the area of the region of interest according to the preset step length until the region of interest is enlarged to the whole image.

What is claimed is:

1. An electroencephalogram-controlled video input and auditory display blind guiding method based on an electroencephalogram-controlled video input and auditory display blind guiding apparatus comprising a video acquisition module, an electroencephalogram acquisition module, a processor and an audio playback module, the method comprising the following steps:

step 1: acquiring a video signal by the video acquisition nodule and transmitting the video signal to the processor;

step 2: extracting, by the processor, image information of a current region of interest in a video, wherein the following method is used in the step 2 to extract the image information of the current region of interest in the video:

step 2.1: intercepting a frame of image from a current video stream;

step 2.2: intercepting a corresponding sub-image in a current video image according to a position of the current region of interest; and step 2.3: performing image segmentation on the sub-image obtained in the step 2.2, and dividing a foreground object and a background;

step 3: mapping, by the processor, the image information obtained in the step 2 into an audio signal according to a mapping relationship between current image information and an audio signal;

step 4: outputting the audio signal obtained in the step 3 to the audio playback module for playing back;

step 5: acquiring, by the electroencephalogram acquisition module, an electroencephalogram signal and transmitting the electroencephalogram signal to the processor; and step 6: recognizing, by the processor, a current electroencephalogram signal, modifying setting of the current region of interest according to a recognition result, and then returning to the step 1 for continuous execution, wherein the following method is used in the step 3 to map the image information into the audio signal:

step 3.1: mapping a coordinate of each pixel in the image into an incoming wave direction in a sound field;

step 3.2: mapping a brightness of a pixel of the foreground object into a sound intensity according to setting of an intensity of mapping of a current image brightness into a sound intensity; and step 3.3: calculating a head transmission function in the incoming wave direction corresponding to each pixel, amplifying a preset excitation audio to the sound intensity corresponding to the pixel, and then filtering with the head transmission function to obtain a dual-channel audio signal corresponding to the pixel.

2. An electroencephalogram-controlled video input and auditory display blind guiding method based on an electroencephalogram-controlled video input and auditory display blind guiding apparatus comprising a video acquisition module, an electroencephalogram acquisition module, a processor and an audio playback module, the method comprising the following steps:

step 1: acquiring a video signal by the video acquisition module and transmitting the video signal to the processor;

step 2: extracting, by the processor, image information of a current region of interest in a video, wherein the following method is used in the step 2 to extract the image information of the current region of interest in the video:

step 2.1: intercepting a frame of image from a current video stream;

step 2.2: intercepting a corresponding sub-image in a current video image according to a position of the current region of interest; and step 2.3: performing image segmentation on the sub-image obtained in the step 2.2, and dividing a foreground object and a background;

step 3: mapping, by the processor, the image information obtained in the step 2 into an audio signal according to a mapping relationship between current image information and an audio signal;

step 4: outputting the audio signal obtained in the step 3 to the audio playback module for playing back;

step 5: acquiring, by the electroencephalogram acquisition module, an electroencephalogram signal and transmitting the electroencephalogram signal to the processor; and step 6: recognizing, by the processor, a current electroencephalogram signal, modifying setting of the current region of interest according to a recognition result, and then returning to the step 1 for continuous execution, wherein the following method is used in the step 4 to output the audio signal to the audio playback module for playing back:

step 4.1: selecting a foreground object in the sub-image obtained in the step 2.2;

step 4.2: extracting dual-channel audio signals corresponding to all pixel points of the foreground object;

step 4.3: playing back the dual-channel audio signals as described above successively; and step 4.4: if an unselected foreground object still exists in the sub-image, selecting the unselected foreground object, and then returning to the step 4.2, otherwise, finishing playing back the audio corresponding to the frame of image.

3. An electroencephalogram-controlled video input and auditory display blind guiding method based on an electroencephalogram-controlled video input and auditory display blind guiding apparatus comprising a video acquisition module, an electroencephalogram acquisition module, a processor and an audio playback module, the method comprising the following steps:

step 1: acquiring a video signal by the video acquisition module and transmitting the video signal to the processor;

step 2: extracting, by the processor, image information of a current region of interest in a video, wherein the following method is used in the step 2 to extract the image information of the current region of interest in the video:

step 2.1: intercepting a frame of image from a current video stream;

step 2.2: intercepting a corresponding sub-image in a current video image according to a position of the current region of interest; and step 2.3: performing image segmentation on the sub-image obtained in the step 2.2, and dividing a foreground object and a background;

step 3: mapping, by the processor, the image information obtained in the step 2 into an audio signal according to a mapping relationship between current image information and an audio signal;

step 4: outputting the audio signal obtained in the step 3 to the audio playback module for playing back;

step 5: acquiring, by the electroencephalogram acquisition module, an electroencephalogram signal and transmitting the electroencephalogram signal to the processor; and step 6: recognizing, by the processor, a current electroencephalogram signal, modifying setting of the current region of interest according to a recognition result, and then returning to the step 1 for continuous execution, wherein the following method is used in the step 6 to modify the setting of the current region of interest according to the current electroencephalogram signal:

when the audio playback module plays back the audio signal corresponding to the pixel point of one foreground object, detecting whether an auditory evoked potential exists in the electroencephalogram signal, when an auditory evoked potential is continuously detected, moving a center of the current region of interest to a center of the foreground object according to a preset step length, and reducing an area of the region of interest according to the preset step length; and when continuous auditory evoked potentials cannot be detected, moving the center of the current region of interest to a center of the image obtained in the step 2.1 according to the preset step length, and increasing the area of the region of interest according to the preset step length.

* * * * *